US012119165B2

(12) United States Patent
Jung et al.

(10) Patent No.: US 12,119,165 B2
(45) Date of Patent: Oct. 15, 2024

(54) COIL COMPONENT

(71) Applicant: SAMSUNG ELECTRO-MECHANICS CO., LTD., Suwon-si (KR)

(72) Inventors: Ye Ji Jung, Suwon-si (KR); Jae Hun Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 806 days.

(21) Appl. No.: 17/180,086

(22) Filed: Feb. 19, 2021

(65) Prior Publication Data

US 2022/0165486 A1 May 26, 2022

(30) Foreign Application Priority Data

Nov. 26, 2020 (KR) ........................ 10-2020-0160819

(51) Int. Cl.
*H01F 27/29* (2006.01)
*H01F 17/00* (2006.01)
*H01F 27/32* (2006.01)

(52) U.S. Cl.
CPC ....... *H01F 27/292* (2013.01); *H01F 17/0013* (2013.01); *H01F 27/324* (2013.01); *H01F 2017/002* (2013.01)

(58) Field of Classification Search
CPC .. H01F 27/292; H01F 17/0013; H01F 27/234; H01F 2017/002
USPC .......................................................... 336/200
See application file for complete search history.

(56) References Cited

U.S. PATENT DOCUMENTS 9,349,525 B2 * 5/2016 Jeong .................. H01F 17/0033
9,655,247 B1 * 5/2017 Yoon ....................... H01F 27/24
11,527,342 B2 * 12/2022 Arai .......................... H01F 5/04
11,769,619 B2 * 9/2023 Park .................... H01F 27/2885 336/200
2007/0182519 A1 * 8/2007 Tsuzuki ............. H01F 17/0006 336/200
2014/0022041 A1 * 1/2014 Park .......................... H01F 5/00 336/199
2016/0078994 A1 * 3/2016 Yoon ......................... H01F 5/00 336/200
2016/0268038 A1 * 9/2016 Choi ..................... H01F 27/255
(Continued)

FOREIGN PATENT DOCUMENTS

KR 10-1662209 B1 10/2016
KR 10-2018-0081475 A 7/2018
KR 10-1952873 B1 2/2019

OTHER PUBLICATIONS

Wurth, "WE-MAPI, 2510 Wire-wound SMD Inductor with a Composite Iron Powder Core, 4.7 µH ±20% Moulded 940mA Idc," (https://sg.rs-online.com/web/p/wire-wound-surface-mount-inductors/7922720/).

*Primary Examiner* — Shawki S Ismail
*Assistant Examiner* — Joselito S. Baisa
(74) *Attorney, Agent, or Firm* — Morgan, Lewis & Bockius LLP

(57) ABSTRACT

A coil component includes: a body; a coil unit disposed in the body; a support substrate unit in contact with the coil unit to support the coil unit, and including first and second support substrates spaced apart from and oppose each other; and first and second external electrodes disposed on a first surface of the body and spaced apart from each other, and respectively connected to the coil unit.

22 Claims, 13 Drawing Sheets

(56) References Cited

U.S. PATENT DOCUMENTS

| | | | | |
|---|---|---|---|---|
| 2017/0025220 | A1* | 1/2017 | Nakaniwa | H01F 27/245 |
| 2018/0197672 | A1 | 7/2018 | Kim et al. | |
| 2019/0013141 | A1 | 1/2019 | Yoon et al. | |
| 2020/0027645 | A1* | 1/2020 | Yoshioka | H01F 27/323 |
| 2020/0126711 | A1* | 4/2020 | Park | H05K 9/0083 |
| 2020/0279687 | A1* | 9/2020 | Koo | H01F 17/04 |
| 2021/0174996 | A1* | 6/2021 | Song | H01F 17/0013 |
| 2021/0210276 | A1* | 7/2021 | Park | H01F 27/2885 |
| 2022/0165485 | A1* | 5/2022 | Cho | H01F 17/0013 |

* cited by examiner

COIL COMPONENT

CROSS-REFERENCE TO RELATED APPLICATION(S)

The present application claims the benefit of priority to Korean Patent Application No. 10-2020-0160819, filed on Nov. 26, 2020 in the Korean Intellectual Property Office, the disclosure of which is incorporated herein by reference in its entirety.

TECHNICAL FIELD

The present disclosure relates to a coil component.

BACKGROUND

In recent years, as electronic products, smartphones in particular, have evolved, there is an increasing demand for a compact power inductor for high current applications, having high efficiency and high performance.

SUMMARY

An aspect of the present disclosure may provide a coil component for miniaturizing a product.

Another aspect of the present disclosure may provide a coil component capable of increasing the volume of a magnetic material.

Another aspect of the present disclosure may provide a coil component having a reduced mounting area.

Another aspect of the present disclosure may provide a coil component including a coil having a high aspect ratio.

According to an aspect of the present disclosure, a coil component may include: a body; a coil unit disposed in the body; a support substrate unit in contact with the coil unit to support the coil unit, and including first and second support substrates spaced apart from and oppose each other; and first and second external electrodes disposed on a first surface of the body and spaced apart from each other, and respectively connected to the coil unit.

According to another aspect of the present disclosure, a coil component may include: a body; a support substrate unit disposed in the body; a coil unit disposed in the body, and including a coil pattern and first and second lead portions respectively connected to the coil pattern and exposed to one surface of the body; and first and second external electrodes disposed on the one surface of the body to be spaced apart from each other, and respectively connected to first and second lead portions, wherein the support substrate unit is disposed on a region of the coil unit.

According to still another aspect of the present disclosure, a coil component may include: a body including first and second surfaces opposing each other and a plurality of side surfaces connecting the first and second surfaces of the body to each other; a support substrate unit disposed in the body; a coil unit disposed on a first surface of the support substrate unit; and first and second external electrodes disposed on the first surface of the body and spaced apart from each other, and respectively connected to the coil unit, wherein the support substrate unit includes first and second support substrates spaced apart from each other and exposed to different side surfaces, respectively, among the plurality of side surfaces of the body.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Coil Component

Figure 1:
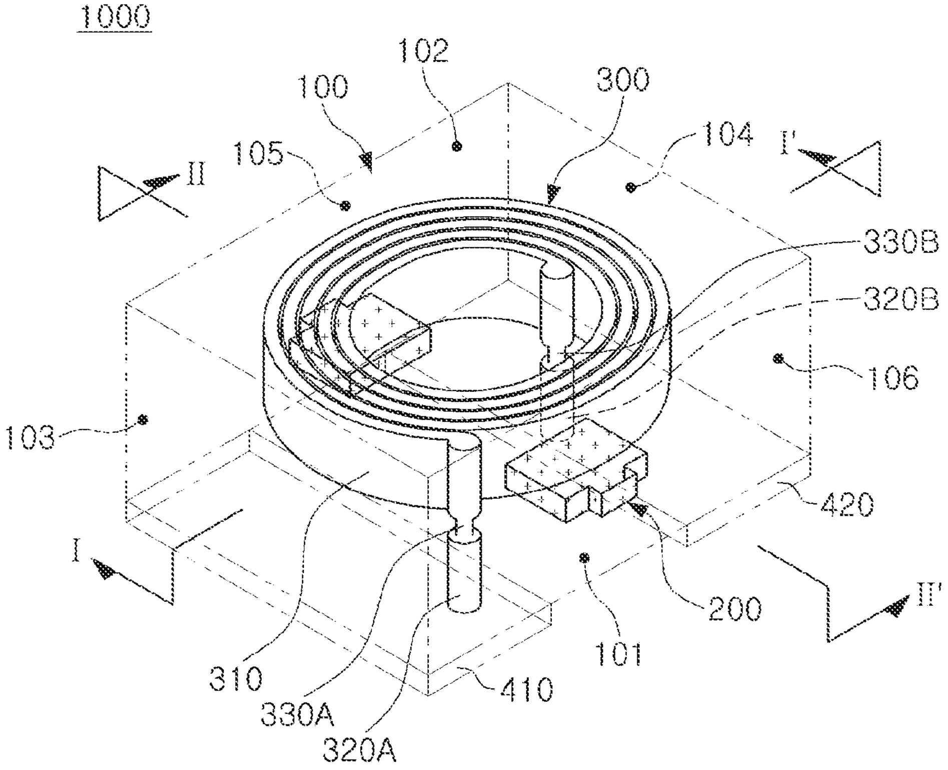
FIG. 1 is a schematic perspective view of a coil component according to a first exemplary embodiment in the present disclosure.

FIG. 1 is a schematic perspective view of a coil component according to a first exemplary embodiment in the present disclosure.

Figure 2:
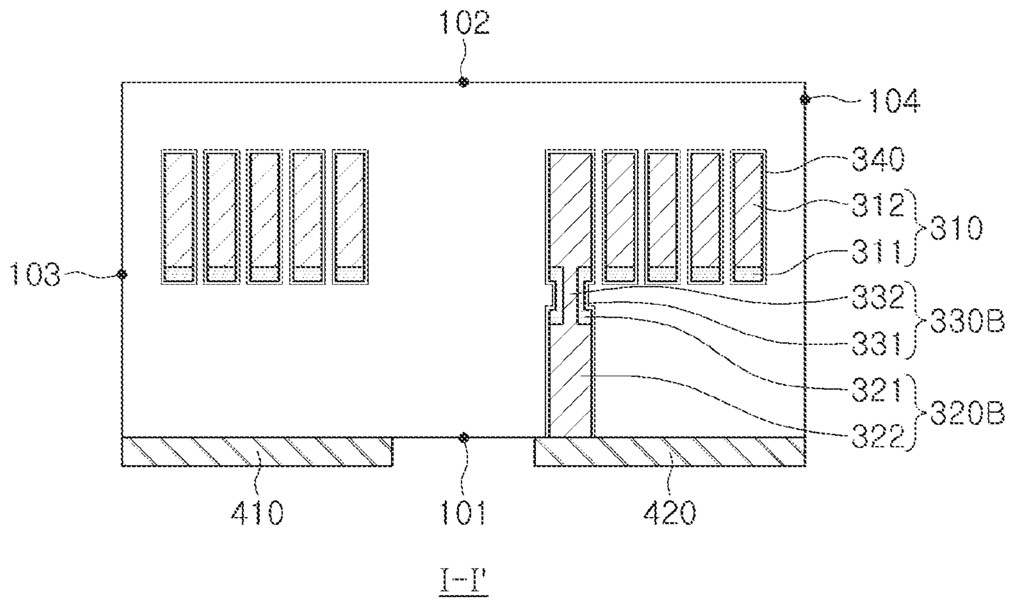
FIG. 2 is a schematic cross-sectional view of the coil component cut in a direction I-I' according to the first exemplary embodiment in the present disclosure.

FIG. 2 is a schematic cross-sectional view of the coil component cut in a direction I-I' according to the first exemplary embodiment in the present disclosure.

Figure 3:
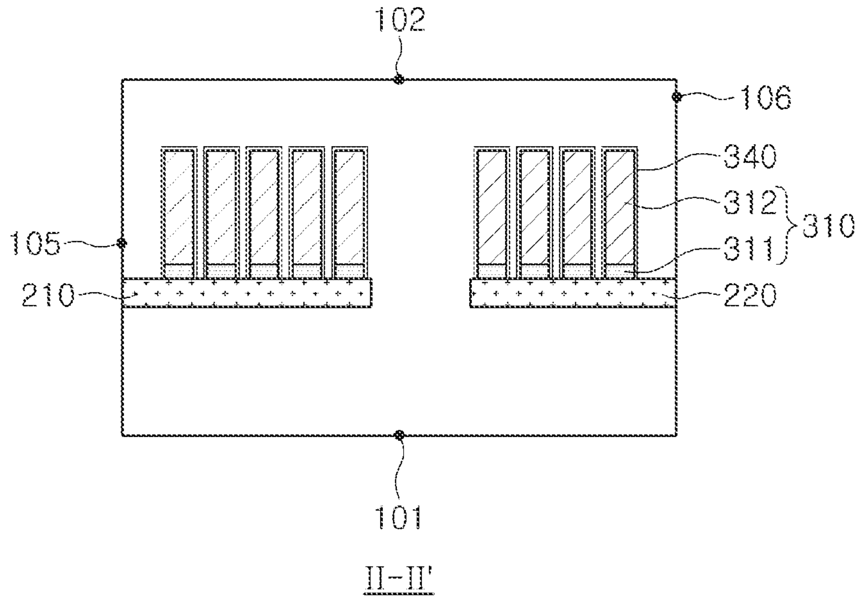
FIG. 3 is a schematic cross-sectional view of the coil component cut in a direction II-II' according to the first exemplary embodiment in the present disclosure.

FIG. 3 is a schematic cross-sectional view of the coil component cut in a direction II-II' according to the first exemplary embodiment in the present disclosure.

Figure 4:
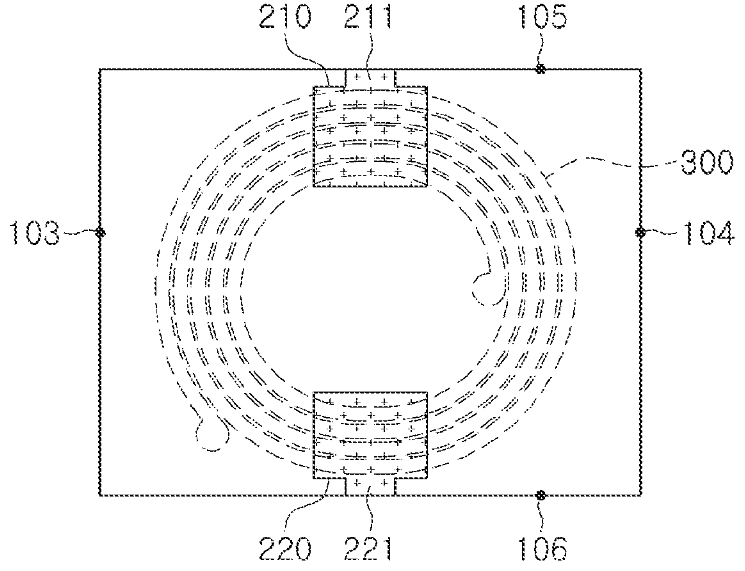
FIG. 4 is a schematic plan view of the coil component according to the first exemplary embodiment in the present disclosure.

FIG. 4 is a schematic plan view of the coil component according to the first exemplary embodiment in the present disclosure.

Referring to the drawings, a coil component 1000 according to a first exemplary embodiment in the present disclosure may include: a body 100; a support substrate unit 200; a coil unit 300; a first external electrode 410; and a second external electrode 420.

The body 100 may form an appearance of the coil component 1000, and the coil unit 300 may be buried in the body 100. The body 100 may have a first surface 101, a second surface 102 opposite to the first surface 101, and a plurality of side surfaces 103, 104, 105 and 106 respectively connecting the first surface 101 and the second surface 102 to each other. The plurality of side surfaces 103, 104, 105 and 106 may include a first side surface 105 and a second side surface 106 opposite to each other, and a third side surface 103 and a fourth side surface 104, which are respectively perpendicular to the first side surface 105 and the second side surface 106 and opposite to each other. The body 100 may substantially have a hexahedral shape, and is not limited thereto.

The body 100 may include a magnetic material and resin. In detail, the body 100 may be formed by stacking one or more magnetic composite sheets in which the magnetic material is dispersed in the resin. The magnetic material may be a ferrite or magnetic metallic powder.

The ferrite may be, for example, at least one of a spinel type ferrite such as Mg—Zn-based ferrite, Mn—Zn-based ferrite, Mn—Mg-based ferrite, Cu—Zn-based ferrite, Mg—Mn—Sr-based ferrite or Ni—Zn-based ferrite; a hexagonal type ferrite such as Ba—Zn-based ferrite, Ba—Mg-based ferrite, Ba—Ni-based ferrite, Ba—Co-based ferrite or Ba—Ni—Co-based ferrite; and a garnet type ferrite such as Y-based ferrite or Li-based ferrite.

The magnetic metallic powder may include one or more selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metallic powder may be at least one of pure iron powder, Fe—Si-based alloy powder, Fe—Si—Al-based alloy powder, Fe—Ni-based alloy powder, Fe—Ni—Mo-based alloy powder, Fe—Cr-based alloy powder and Fe—Cr—Si-based alloy powder.

The magnetic metallic powder may be amorphous or crystalline. For example, the metal magnetic powder may be Fe—Si—B—Cr-based amorphous alloy powder, and is not necessarily limited thereto.

The resin may include epoxy, polyimide, liquid crystal polymer (LCP) or the like, or a mixture thereof, and is not limited thereto.

The support substrate unit 200 may be disposed in the body 100 and in contact with the coil unit 300 to support the coil unit 300. A region of the support substrate unit 200, overlapping the coil portion 300, may be removed on a plane, and the support substrate unit 200 may thus be disposed on a region of the coil unit 300.

The support substrate unit 200 may include a first support substrate 210 and a second support substrate 220, which are the plurality of support substrates disposed on the coil unit 300 to be spaced apart from each other, and the first and second support substrates 210 and 220 may be spaced apart from and oppose each other. However, the number and/or arrangement of the support substrates included in the support substrate unit 200 is not limited thereto.

As shown in the drawings, the first support substrate 210 may be adjacent to the first side surface 105 of the body 100, and disposed to be spaced apart from edges among the first side surface 105, third side surface 103 and fourth side surface 104 of the body 100, respectively; and the second support substrate 220 may be adjacent to the second side surface 106 of the body 100, and disposed to be spaced apart from edges among the second side surface 106, third side surface 103 and fourth side surface 104 of the body 100, respectively.

The first support substrate 210 may have a first exposed portion 211 exposed to the first side surface 105 of the body 100, and the second support substrate 220 may have a second exposed portion 221 exposed to the second side surface 106 opposite to the first side surface 105 of the body 100.

Meanwhile, the support substrate unit 200 according to the present disclosure may be removed leaving only a region enabling the support substrate unit 200 to support the coil unit 300. As such, it is possible to secure a space for filling the magnetic material in the body 100 by removing the remaining regions of the substrate while leaving only the minimum region enabling the support substrate unit 200 to support the coil unit 300.

Meanwhile, the first exposed portion 211 and the second exposed portion 221 may each be a region exposed by dicing a plurality of bodies 100 respectively including the support substrate unit 200 and the coil unit 300 and connected to each other. In detail, a plurality of coil units 300 may be formed on the substrate, the remaining regions of the substrate may be removed except for the first support substrate 210 and the second support substrate 220, and the magnetic sheet may then be pressed and cured to form the plurality of bodies 100. Then, through a dicing process to divide the plurality of bodies 100 into each individual body 100, the first exposed portion 211 and the second exposed portion 221 may be exposed to the first side surface 105 and second side surface 106 of the body 100, respectively.

The coil unit 300 may be disposed in the body 100 and exhibit a characteristic of the coil component. For example, when the coil component 1000 is used as a power inductor, the coil unit 300 may serve to store an electric field as a magnetic field to maintain an output voltage, thereby stabilizing power of an electronic device.

The coil unit 300 may include a coil pattern 310 disposed on one side of the support substrate unit 200, and first and second lead portions 320A and 320B each disposed on the other side opposite to the one side of the support substrate unit 200 and respectively connecting the coil pattern 310 to the first and second external electrodes 410 and 420. In addition, the coil unit 300 may further include a first via 330A and a second via 330B respectively connecting the coil pattern 310 to the first and second lead portions 320A and 320B.

Depending on the process, the coil pattern 310, the first lead portion 320A, the second lead portion 320B, the first via 330A and the second via 330B may have boundaries therebetween, or may be integrated with one another without such boundaries.

Meanwhile, the coil unit 300 may further include an insulating film 340 covering at least a portion of each of the coil pattern 310, the first lead portion 320A and the second lead portion 320B. When the coil unit 300 further includes the first via 330A and the second via 330B, the insulating film 340 may further cover the first via 330A and the second via 330B.

The coil pattern 310 may have a plurality of turns and have a flat spiral shape and a core portion C penetrating the coil pattern 310. The plurality of turns of the coil pattern 310 may surround the core portion C of the coil pattern 310. Respective ones of the plurality of turns may be connected to each other via the first support substrate 210 and the second support substrate 220.

Referring to FIG. 4, according to one embodiment of the present disclosure, a maximum width of the core portion C may be larger than a maximum width of each of the first and second support substrates 210 and 220. As such, a cross-sectional area of the core portion C may increase, thereby increasing the volume of a magnetic material of the body 100.

The coil pattern 310 may have a high aspect ratio (AR), and for example, the coil pattern 310 may have a width of 45 μm and the height of 190 μm, and is not limited thereto. The description below describes a detailed process for implementing the coil pattern 310 having the high aspect ratio.

The coil pattern 310 may include a first metal layer 311 and a second metal layer 312 disposed on the first metal layer 311. For example, the coil pattern 310 may include the first metal layer 311 formed through electroless plating or the like, and second metal layer 312 formed on the first metal layer 311 through the electroplating or the like.

The coil pattern 310 may be formed of a conductive material such as copper (Cu), aluminum (Al), silver (Ag), tin (Sn), gold (Au), nickel (Ni), lead (Pb), titanium (Ti) or alloys thereof.

The first lead portion 320A may be connected to an outermost turn of the plurality of turns of the coil pattern 310, and the second lead portion 320B may be connected to an innermost turn of the plurality of turns of the coil pattern 310. Here, the first lead portion 320A and the second lead portion 320B may be respectively connected to both ends of the coil pattern 310. In addition, each of the first lead portion 320A and the second lead portion 320B may be exposed to the one surface 101 of the body 100, and may thus be connected to each of the first external electrode 410 and the second external electrode 420.

The height of each of the first lead portion 320A and the second lead portion 320B may be the same as or different from the height of the coil pattern 310. When the height of each of the first lead portion 320A and the second lead portion 320B is different from that of the coil pattern 310, the height of each of the first lead portion 320A and the second lead portion 320B may be higher or lower than the height of the coil pattern 310. In particular, when the height of each of the first lead portion 320A and the second lead portion 320B is lower than the height of the coil pattern 310, the thickness of the coil component 1000 may be reduced.

Each of the first lead portion 320A and the second lead portion 320B may include a third metal layer 321 and a fourth metal layer 322 disposed on the third metal layer 321. For example, each of the first lead portion 320A and the second lead portion 320B may have the third metal layer 321 formed through the electroless plating or the like, and may have a fourth metal layer 322 formed on the third metal layer 321 through the electroplating or the like. Meanwhile, the drawing only shows that the third metal layer 321 and the fourth metal layer 322 are used in the second lead portion 320B. However, the same structure may be used in the first lead portion 320A.

Each of the first lead portion 320A and the second lead portion 320B may also be formed of copper (Cu), aluminum (Al), silver (Ag), tin (Sn), gold (Au), nickel (Ni), lead (Pb), titanium (Ti) or alloys thereof.

Each width of the first via 330A and the second via 330B may be smaller than that of the first lead portion 320A and the second lead portion 320B. In addition, the each width of the first via 330A and the second via 330B may be smaller than that of the coil pattern 310.

Each of the first via 330A and the second via 330B may include a fifth metal layer 332 and a sixth metal layer 331 surrounding the fifth metal layer 332. For example, each of the first via 330A and the second via 330B may have the sixth metal layer 331 formed on its exterior through the electroless plating or the like, and may have the fifth metal layer 332 formed through the electroplating or the like to fill the interior of the sixth metal layer 331. Meanwhile, FIG. 2 only shows that the fifth metal layer 332 and the sixth metal layer 331 are used in the second via 330B. However, the same structure may be used in the first via 330A.

Meanwhile, the sixth metal layer 331 may be integrated with the first metal layer 311 and may also be integrated with the third metal layer 321. The fifth metal layer 332 may be integrated with the second metal layer 312 and may also be integrated with the fourth metal layer 322. The coil unit 300 may have this structure by having the first metal layer 311, the third metal layer 321 and the sixth metal layer 331 formed together through the electroless plating, and by having the second metal layer 312, the fourth metal layer 322 and the fifth metal layer 332 formed together through the electroplating.

However, the plurality of metal layers 311, 312, 321, 322, 331 and 332 may be distinguished from each other. For example, it is possible to first form the first via 330A and the second via 330B by forming the sixth metal layer 331 through the electroless plating, and by forming the fifth metal layer 332 through the electroplating to fill the interior of the sixth metal layer 331. Next, the coil unit may have this structure by respectively forming the first metal layer 311 and the second metal layer 321 through the electroless plating on both sides of the first via 330A and the second via 330B, and by respectively forming the second metal layer 312 and the fourth metal layer 322 through the electroplating.

Each of the first lead portion 330A and the second lead portion 330B may also be formed of a conductive material such as copper (Cu), aluminum (Al), silver (Ag), tin (Sn), gold (Au), nickel (Ni), lead (Pb), titanium (Ti) or alloys thereof.

The insulating film 340 may cover at least one of side surfaces of the first via 330A and second via 330B. For example, as shown in the drawings, the insulating film 340 may cover respective side surfaces of the first via 330A and second via 330B, or only one of the side surfaces of the first via 330A and second via 330B. Each of the vias 330A and 330B according to the present disclosure may have such a structure by removing a region of the substrate disposed around at least one of the first via 330A and the second via 330B when the region of the substrate is partially removed.

Meanwhile, the first via 330A and/or the second via 330B may pass through the support substrate unit 200 and the side surface thereof and may thus be in contact with the support substrate unit 200. This structure is described in detail when describing the coil component according to another exemplary embodiment.

The insulating film 340 may serve to insulate the coil unit 300 from the body 100. Therefore, the insulating film 340 may be disposed to cover a region of the coil unit 300 that is not in contact with the support substrate unit 200. The insulating film 340 may be conformally disposed along a surface of the coil pattern 310, and may be disposed to fill a gap between the respective ones of the plurality of turns of the coil pattern 310. In addition, the insulating film 340 may cover at least a portion of each of the first lead portion 320A and the second lead portion 320B, and specifically, may cover the side and upper surfaces of each of the first lead portion 320A and the second lead portion 320B based on FIG. 2. In addition, the insulating film 340 may further cover at least one of the first via 330A and second via 330B, and specifically, may further cover at least one of the side surfaces of the first via 330A and second via 330B.

Any insulating material may be used without limitation as long as the material is able to form the insulating film 340 and for example, it is possible to use at least one of epoxy resin, polyimide resin and perylene resin. The method of forming the insulating film 340 is not particularly limited, and the insulating film 340 may be formed by chemical vapor deposition (CVD) or sputtering for example.

Meanwhile, the coil unit 300 according to the present disclosure may have a monolayer coil structure in which the coil pattern 310 is only disposed on one side of the support substrate unit 200. Therefore, the present disclosure may provide the coil component capable of miniaturizing a product.

The first and second external electrodes 410 and 420 may be disposed on the one surface 101 of the body 100 to be spaced apart from each other, and may respectively be connected to the coil unit 300. In detail, the first external electrode 410 may be connected to the first lead portion 320A, and the second external electrode 420 may be connected to the second lead portion 320B.

The first external electrode 410 and second external electrode 420 may be disposed only on the one surface 101 of body 100, and may not be disposed on the other surface 102 or the plurality of side surfaces 103, 104, 105 and 106. Through this structure, the present disclosure may reduce a mounting area of the coil component 1000. However, each structure of the first external electrode 410 and the second external electrode 420 is not limited thereto. For example, each of the first external electrode 410 and the second external electrode 420 may be disposed on the one surface 101 of the body 100 and extend to each of the both side surfaces 103 and 104 of the body 100, which are opposite to each other, to have an L shape. For another example, each of the first external electrode 410 and the second external electrode 420 may extend to each of the both side surfaces 103 and 104 of the body 100, which are opposite to each other, and the other surface 102 of the body 100 to have a rotated U shape.

FIGS. 5A through 5G schematically show a manufacturing process diagram of a coil unit among the coil component according to the first exemplary embodiment in the present disclosure based on the cross-sectional view taken in the direction I-I' of FIG. 2.

FIGS. 6A through 6G schematically show a manufacturing process diagram of the coil unit among the coil component according to the first exemplary embodiment in the present disclosure based on the cross-sectional view taken in the direction II-II' of FIG. 3.

Figure 5A:
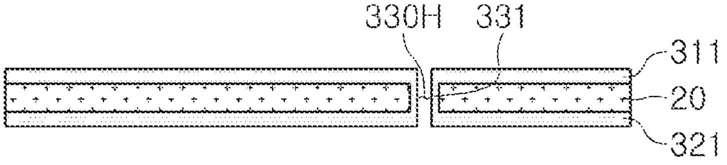
FIGS. 5A through 5G schematically show a manufacturing process diagram of a coil unit among the coil component according to the first exemplary embodiment in the present disclosure based on the cross-sectional view taken in the direction I-I' of FIG. 2.
Figure 6A:
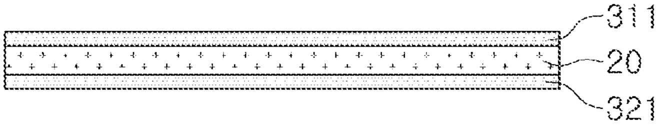
FIGS. 6A through 6G schematically show a manufacturing process diagram of the coil unit among the coil component according to the first exemplary embodiment in the present disclosure based on the cross-sectional view taken in the direction II-II' of FIG. 3.

Referring to FIGS. 5A and 6A, a via hole 330H forming the first via 330A and the second via 330B may be first formed on the substrate 200, and the first metal layer 311, the third metal layer 321 and the sixth metal layer 331, each of which may function as a seed layer, may be formed on the opposite surfaces of substrate 200 and an inner wall of the via hole 330H. Here, the via hole 330H may be formed through laser processing or the like. The first metal layer 311, the third metal layer 321 and the sixth metal layer 331 may be formed through electroless plating or the like, and may be formed simultaneously and integrated with one another.

Figure 5B:
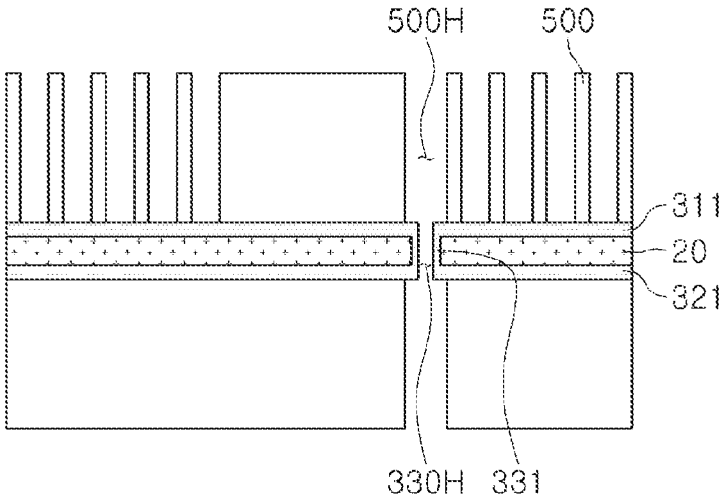
Figure 6B:
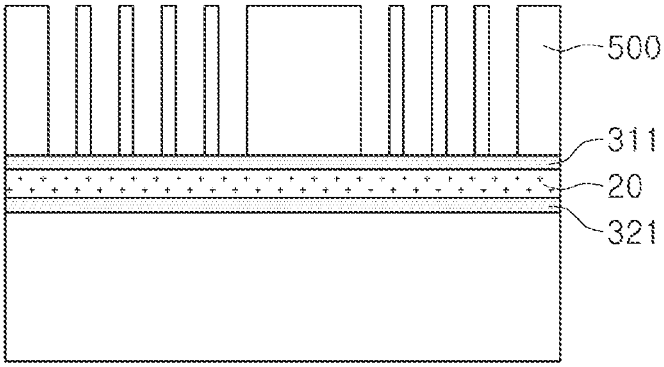

Referring to FIGS. 5B and 6B, an insulating wall 500 which may function as a plating prevention layer may be formed on the substrate 200 on which the first metal layer 311, the third metal layer 321 and the sixth metal layer 331 are formed. The insulating wall 500 may have an opening 500H formed in a region in which the coil unit 300 is to be disposed. The insulating wall 500 may include a photosensitive insulating material, and may thus have the opening 500H formed in the region in which the coil unit 300 is to be disposed through exposure and development.

Figure 5C:
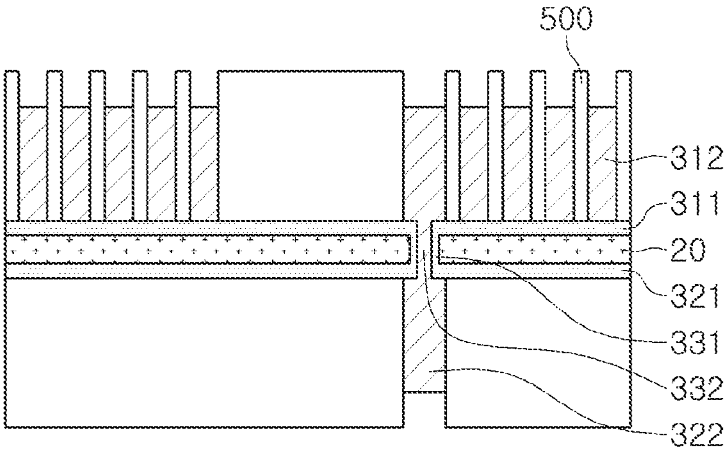
Figure 6C:
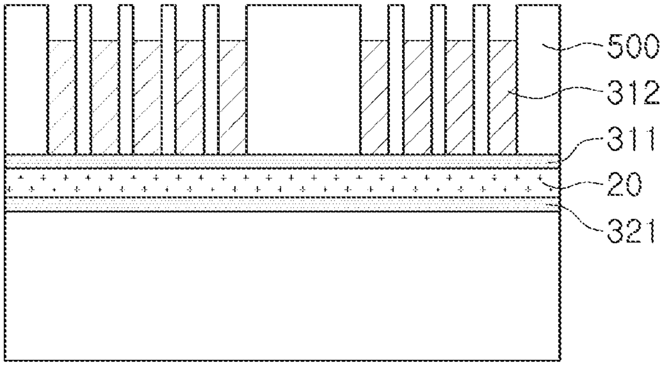

Referring to FIGS. 5C and 6C, the second metal layer 312, the fourth metal layer 322 and the fifth metal layer 332 may be formed in the opening 500H of the insulating wall 500. Therefore, the second metal layer 312, the fourth metal layer 322 and the fifth metal layer 332 may have a shape corresponding to the opening 500H of the insulating wall 500. The second metal layer 312, the fourth metal layer 322 and the fifth metal layer 332 may be formed through the electroplating or the like, and may be formed simultaneously and integrated with one another.

Figure 5D:
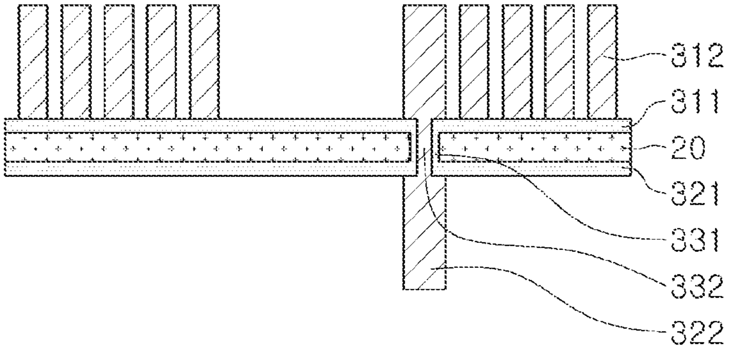
Figure 6D:
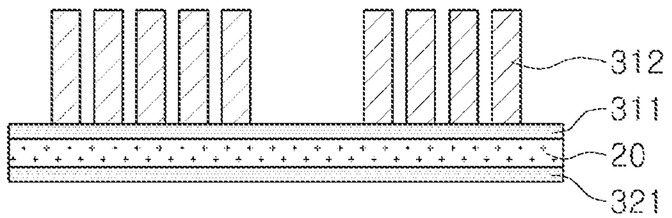

Referring to FIGS. 5D and 6D, the insulating wall 500 may be removed. The insulating wall 500 may be removed by laser trimming, and is not limited thereto.

Figure 5E:
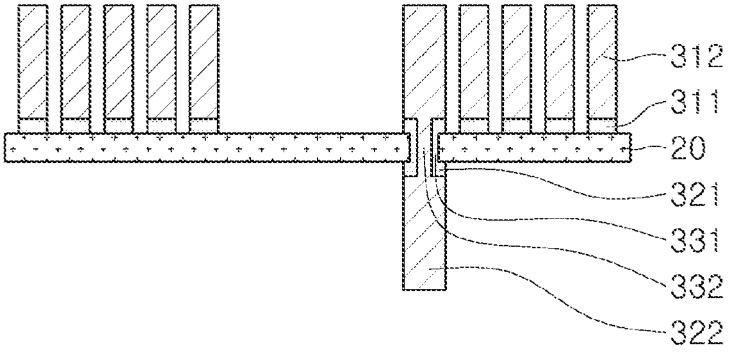
Figure 6E:
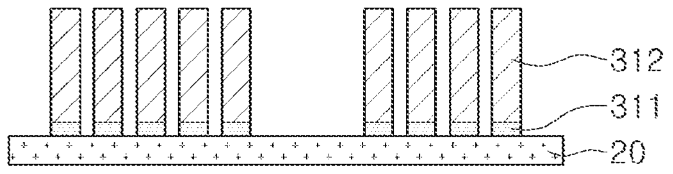

Referring to FIGS. 5E and 6E, the first metal layer 311 and the third metal layer 321 exposed through the removal of the insulating wall 500 may be removed. That is, the first metal layer 311 and the third metal layer 321 disposed on the remaining regions may be removed except for the region in which the coil pattern, the lead portion and the via are formed. The first metal layer 311 and the third metal layer 321 may be removed by etching or the like.

Figure 5F:
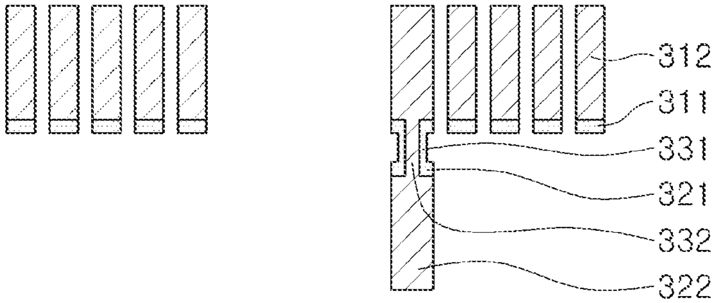
Figure 6F:
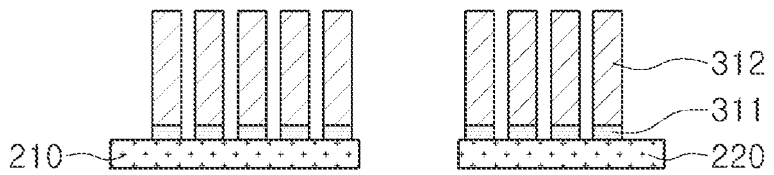

Referring to FIGS. 5F and 6F, only the first support substrate 210 and the second support substrate 220 included in the support substrate unit 200 may be left, and the remaining regions of the substrate 200 may be removed through laser processing or the like. In this manner, a portion of each of the first metal layer 311, the third metal layer 321 and the sixth metal layer 331 may be externally exposed.

Figure 5G:
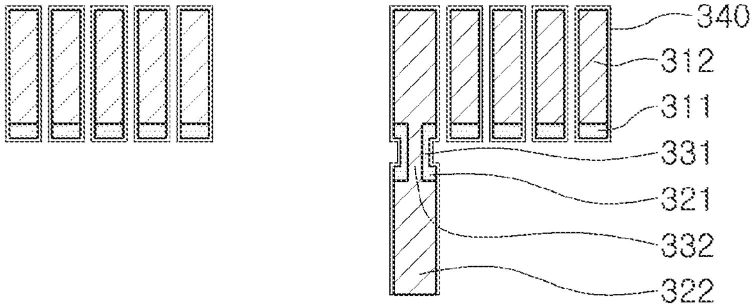
Figure 6G:
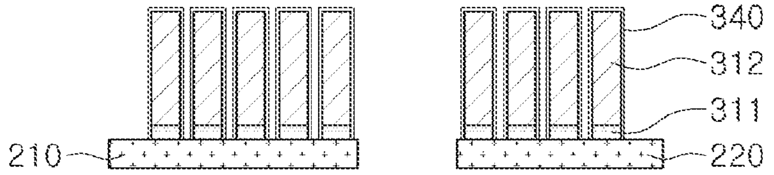

Referring to FIGS. 5G and 6G, the insulating film 340 may be formed on the surfaces of the first to the fifth metal layers 311, 312, 321, 322 and 331. The method of forming the insulating film 340 is not particularly limited, and the insulating film 340 may be formed using a method of forming a perylene film by chemical vapor deposition (CVD) for example. In particular, the surface of the sixth metal layer 331 may be externally exposed as the substrate 200 is removed, and may thus be covered by the insulating film 340. Meanwhile, for connection of the lead portion and the external electrode, the insulating film 340 may not be formed on a lower surface of the fourth metal layer 322 based on the drawing, or may be removed after also being formed on the lower surface of the fourth metal layer 322.

Figure 7A:
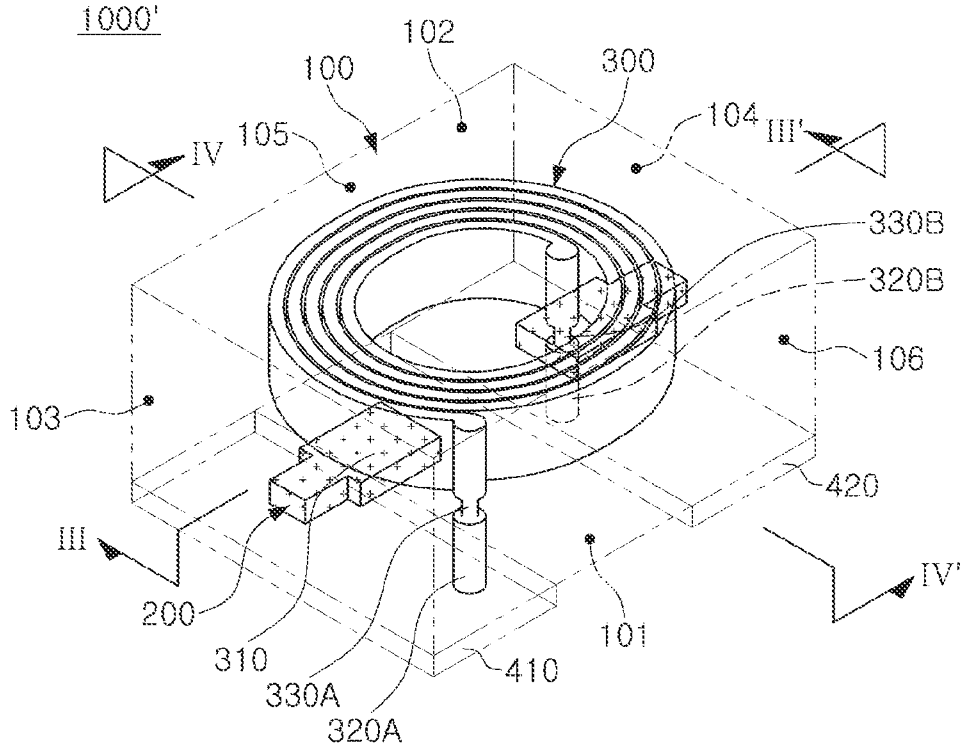
FIGS. 7A and 7B is a schematic perspective view of a coil component according to a second exemplary embodiment in the present disclosure.
Figure 7B:
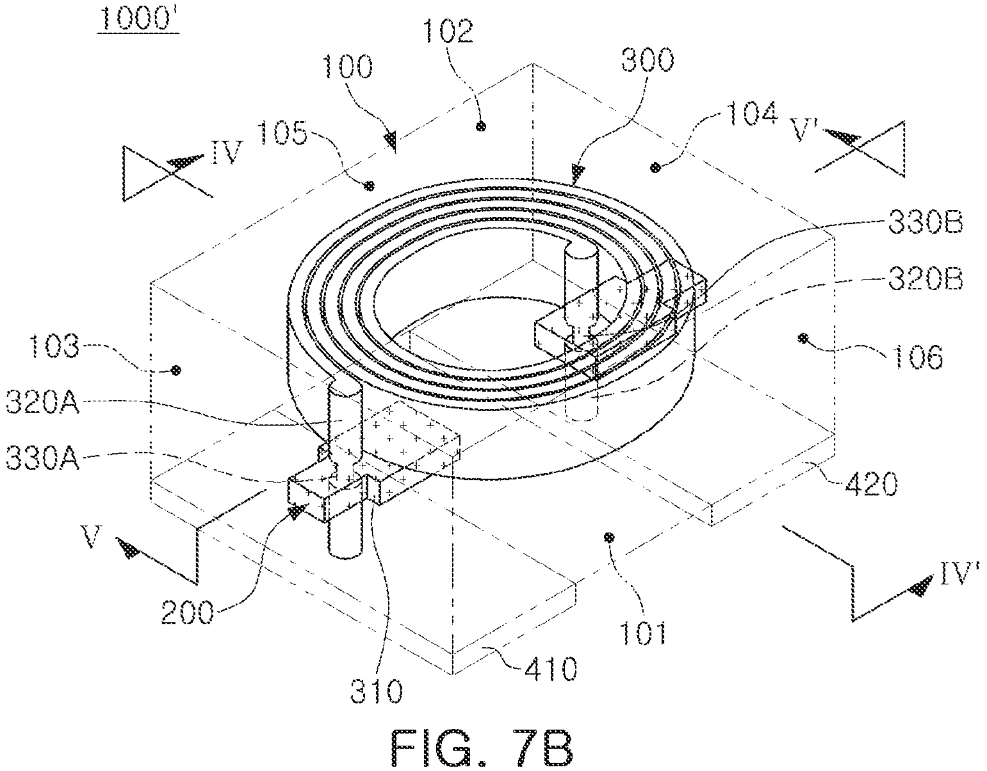

FIGS. 7A and 7B is a schematic perspective view of a coil component according to a second exemplary embodiment in the present disclosure.

Figure 8A:
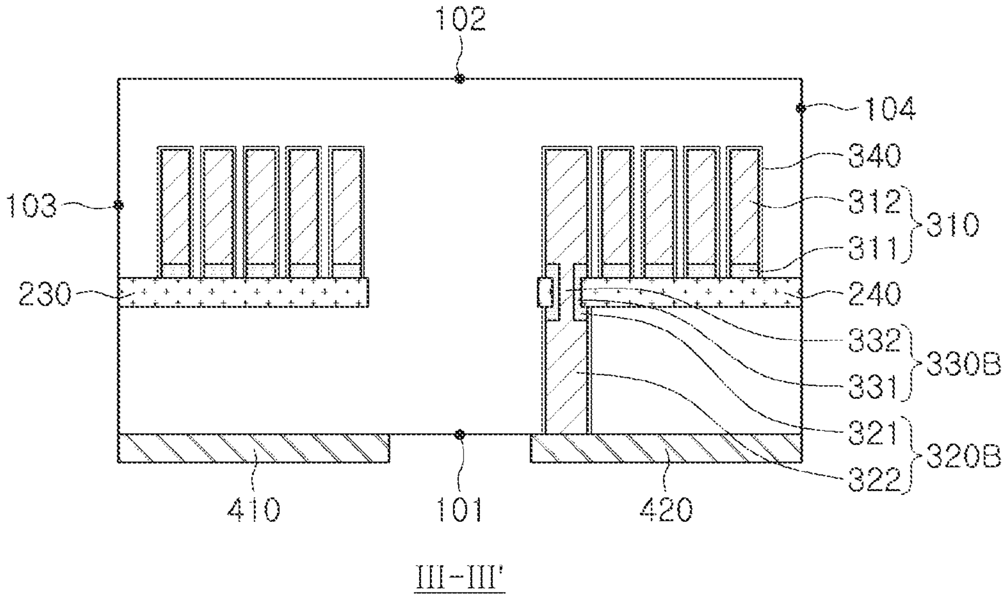
FIGS. 8A and 8B is a schematic cross-sectional view of the coil component cut in a direction according to the second exemplary embodiment in the present disclosure.
Figure 8B:
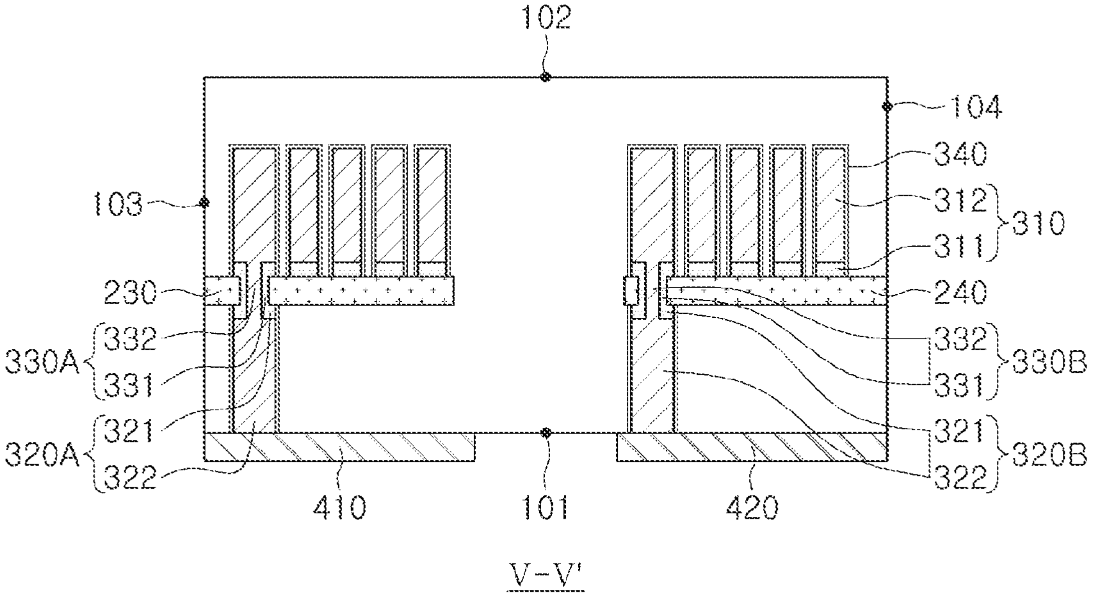

FIGS. 8A and 8B is a schematic cross-sectional view of the coil component cut in a direction according to the second exemplary embodiment in the present disclosure.

Figure 9:
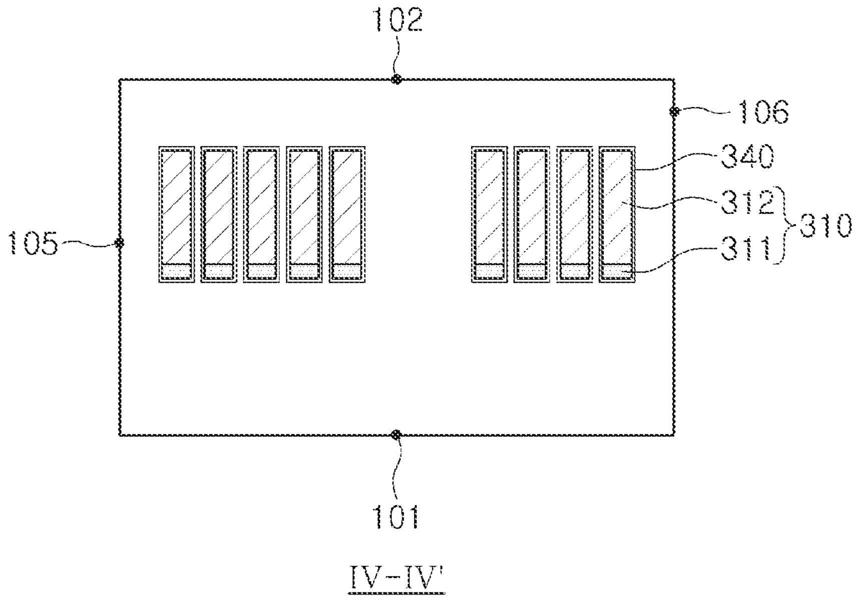
FIG. 9 is a schematic cross-sectional view of the coil component cut in a direction IV-IV' according to the second exemplary embodiment in the present disclosure.

FIG. 9 is a schematic cross-sectional view of the coil component cut in a direction IV-IV' according to the second exemplary embodiment in the present disclosure.

Figure 10A:
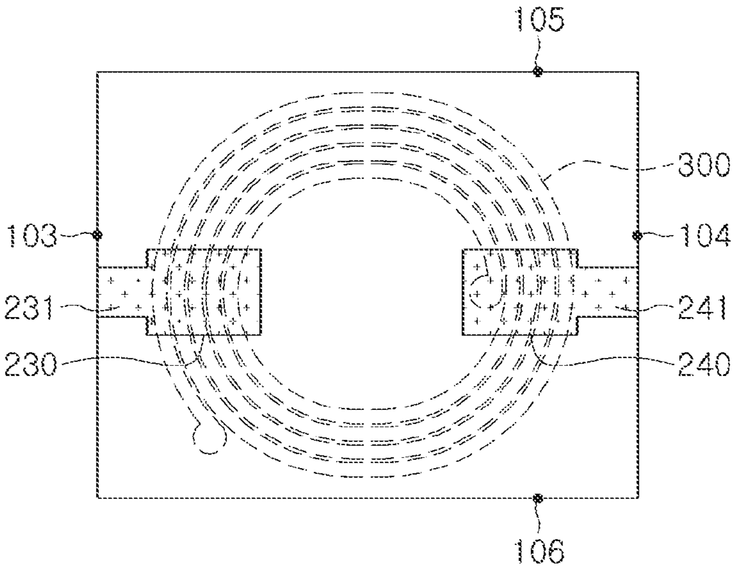
FIGS. 10A and 10B is a schematic plan view of the coil component according to the second exemplary embodiment in the present disclosure.
Figure 10B:
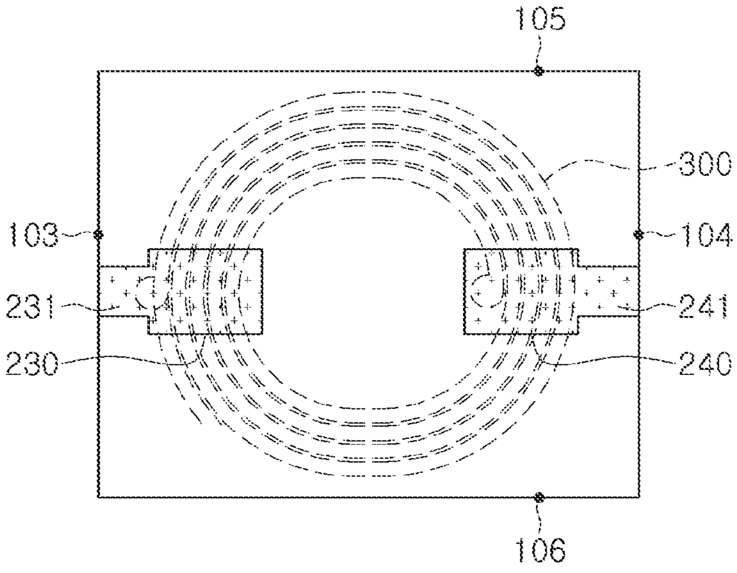

FIGS. 10A and 10B is a schematic plan view of the coil component according to the second exemplary embodiment in the present disclosure.

Referring to the drawings, in a coil component 1000' according to a second exemplary embodiment in the present disclosure, the support substrate unit 200 may include: a third support substrate 230 and a fourth support substrate 240.

As shown in the drawings, the third support substrate 230 may be adjacent to the third side surface 103 of the body 100, and disposed to be spaced apart from edges among the third side surface 103, first side surface 105 and second side surface 106 of the body 100, respectively; and the fourth support substrate 240 may be adjacent to the fourth side surface 104 of the body 100, and disposed to be spaced apart from edges among the fourth side surface 104, first side surface 105 and second side surface 106 of the body 100, respectively.

The third support substrate 230 may have a third exposed portion 231 exposed to the third side surface 103 of the body 100, and the fourth support substrate 240 may have a fourth exposed portion 241 exposed to the fourth side surface 104 of the body 100, which is opposite to the third side surface 103.

At least one of the first via 330A and the second via 330B may penetrate one support substrate of the support substrate unit 200. For example, as shown in the drawings, the second via 330B may penetrate the fourth support substrate 240, and the side surface of the second via 330B may thus be in contact with the fourth support substrate 240. However, the via is not limited to this structure. The first via 330A may penetrate one support substrate of the support substrate unit 200 depending on a position where the via is formed, and both the first via 330A and the second via 330B may penetrate two support substrates of the support substrate unit 200, respectively. Alternatively, none of the first via 330A and the second via 330B may penetrate one support substrate of the support substrate unit 200.

Figure 11:
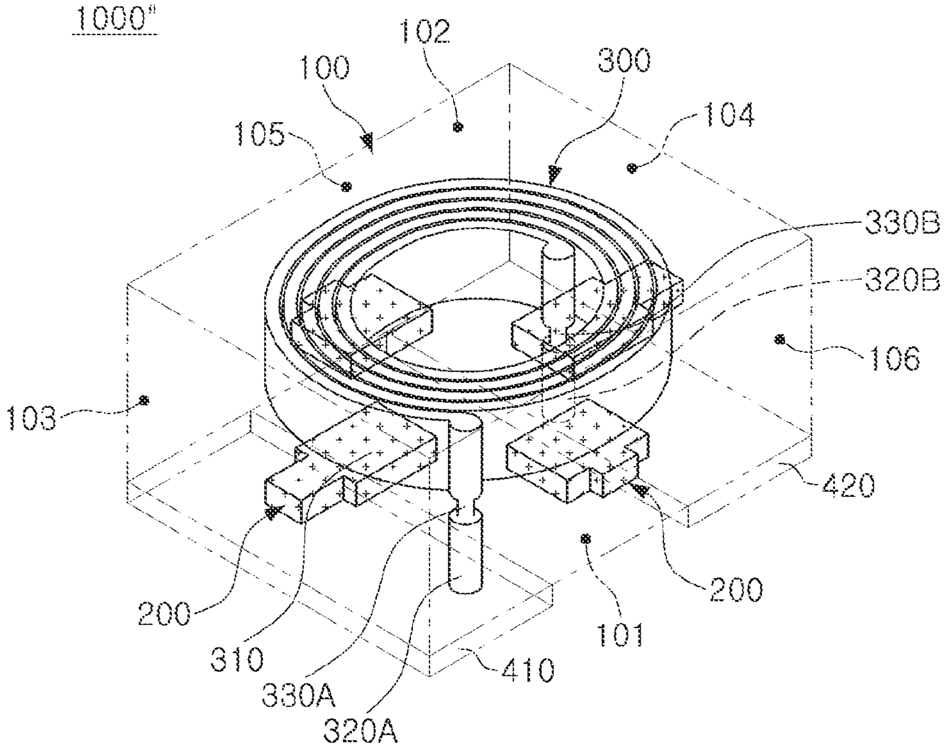
FIG. 11 is a schematic perspective view of a coil component according to a third exemplary embodiment in the present disclosure.

FIG. 11 is a schematic perspective view of a coil component according to a third exemplary embodiment in the present disclosure.

Figure 12:
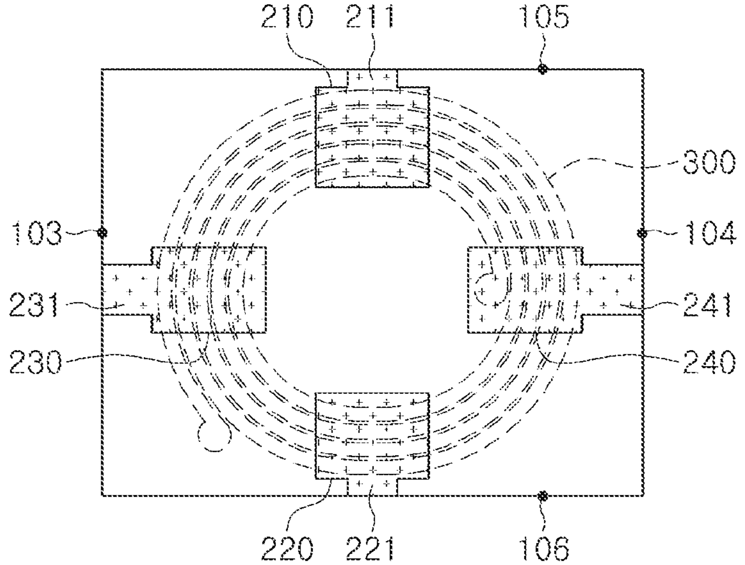
FIG. 12 is a schematic plan view of the coil component according to the third exemplary embodiment in the present disclosure.

FIG. 12 is a schematic plan view of the coil component according to the third exemplary embodiment in the present disclosure.

Referring to the drawings, in a coil component 1000" according to a third exemplary embodiment in the present disclosure, the support substrate unit 200 may include: the first support substrate 210, the second support substrate 220, the third support substrate 230 and the fourth support substrate 240.

However, the support substrate unit 200 may include only some of the first support substrate 210, the second support substrate 220, the third support substrate 230 and the fourth support substrate 240. For example, the support substrate 200 may include the first support substrate 210, the second support substrate 220 and the third support substrate 230, and may not include the fourth support substrate 240. The number and/or arrangement shape of the support substrates included in the support substrate unit 200 may be appropriately changed by those skilled in the art based on design.

In addition, the rest of the description may be substantially the same as the description of the coil component according to an exemplary embodiment in the present disclosure, and thus omits a detailed description thereof.

However, the coil component according to each exemplary embodiment in the present disclosure is to explain that the coil component of the present disclosure may have various structures, and is not intended to limit the structure of the coil component according to the present disclosure to the exemplary embodiments of the present disclosure.

As set forth above, the present disclosure may provide the coil component capable of miniaturizing its product.

The present disclosure may also provide the coil component capable of increasing the volume of a magnetic material.

The present disclosure may also provide the coil component having a reduced mounting area.

The present disclosure may also provide the coil component including a coil having a high aspect ratio.

While exemplary embodiments have been shown and described above, it will be apparent to those skilled in the art that modifications and variations could be made without departing from the scope of the present disclosure as defined by the appended claims.

What is claimed is:

1. A coil component comprising:

a body;

a coil unit disposed in the body;

a support substrate unit in contact with the coil unit to support the coil unit, and including first and second support substrates spaced apart from and opposing each other; and first and second external electrodes disposed on a first surface of the body and spaced apart from each other, and respectively connected to the coil unit, wherein the coil unit is disposed on the support substrate unit in a stacking direction such that portions of a lowermost surface of the coil unit in the stacking direction are respectively disposed on the first and second support substrates.

2. The coil component of claim 1, wherein the body has the first surface, a second surface opposite to the first surface, and a plurality of side surfaces respectively connecting the first surface and the second surface to each other, the first support substrate has a first exposed portion exposed to a first side surface among the plurality of side surfaces, and the second support substrate has a second exposed portion exposed to a second side surface opposite to the first side surface, among the plurality of side surfaces.

3. The coil component of claim 2, wherein the support substrate unit further includes a third support substrate and a fourth support substrate disposed in the body and spaced apart from each other, the third support substrate has a third exposed portion exposed to a third side surface among the plurality of side surfaces, and the fourth support substrate has a fourth exposed portion exposed to a fourth side surface opposite to the third side surface, among the plurality of side surfaces.

4. The coil component of claim 1, wherein the coil unit includes a coil pattern disposed on a first surface of the support substrate unit, and first and second lead portions each disposed on a second surface opposite to the first surface of the support substrate unit and respectively connecting the coil pattern to the first and second external electrodes.

5. The coil component of claim 4, wherein the coil pattern has a plurality of turns, the first lead portion is connected to an outermost turn of the plurality of turns, and the second lead portion is connected to an innermost turn of the plurality of turns.

6. The coil component of claim 4, wherein the coil unit further includes a first via and a second via respectively connecting the coil pattern to the first and second lead portions.

7. The coil component of claim 6, wherein a width of the first via and a width of the second via are smaller than a width of the first lead portion and a width of the second lead portion, respectively.

8. The coil component of claim 6, wherein at least one of the first via and the second via penetrates the first support substrate or the second support substrate.

9. The coil component of claim 6, wherein the coil pattern includes a first metal layer and a second metal layer disposed on the first metal layer, each of the first via and the second via includes a third metal layer and a fourth metal layer surrounding the third metal layer, the first metal layer and the fourth metal layer are integrated with each other, and the second metal layer and the third metal layer are integrated with each other.

10. The coil component of claim 9, wherein each of the first lead portion and the second lead portion includes a fifth metal layer and a sixth metal layer disposed on the fifth metal layer, the fifth metal layer and the fourth metal layer are integrated with each other, and the sixth metal layer and the third metal layer are integrated with each other.

11. The coil component of claim 6, wherein the coil unit further includes an insulating film covering at least a portion of each of the coil pattern, the first lead portion and the second lead portion.

12. The coil component of claim 11, wherein the insulating film covers at least one of side surfaces of the first via and the second via.

13. The coil component of claim 4, wherein each of the first lead portion and the second lead portion is exposed to the first surface of the body.

14. A coil component comprising:

a body;

a support substrate unit disposed in the body and including first and second support substrates spaced apart from each other;

a coil unit disposed in the body, and including a coil pattern and first and second lead portions respectively connected to the coil pattern and exposed to a first surface of the body; and first and second external electrodes disposed on the first surface of the body and spaced apart from each other, and respectively connected to the first and second lead portions, wherein the support substrate unit is disposed on a region of the coil unit in a stacking direction such that a lowermost surface of the coil unit in the stacking direction is disposed on the support substrate unit.

15. The coil component of claim 14, wherein the first and second support substrates are disposed on the coil unit.

16. A coil component comprising:

a body including first and second surfaces opposing each other and a plurality of side surfaces connecting the first and second surfaces of the body to each other;

a support substrate unit disposed in the body;

a coil unit disposed on a first surface of the support substrate unit in a stacking direction; and first and second external electrodes disposed on the first surface of the body and spaced apart from each other, and respectively connected to the coil unit, wherein the support substrate unit includes first and second support substrates spaced apart from each other and exposed to different side surfaces, respectively, among the plurality of side surfaces of the body, and wherein the coil unit includes a plurality of turns surrounding a core portion of the coil unit such that at least two turns of the plurality of turns are disposed on at least one of the first or second support substrate.

17. The coil component of claim 16, wherein the first and second support substrates are exposed to opposite side surfaces, respectively, among the plurality of side surfaces of the body.

18. The coil component of claim 16, wherein the support substrate unit further includes third and fourth support substrates spaced apart from each other and respectively exposed to side surfaces, different from the side surfaces to which the first and second support substrates are exposed, among the plurality of side surfaces of the body.

19. The coil component of claim 16, wherein a maximum width of the core portion is larger than a maximum width of each of the first and second support substrates.

20. The coil component of claim 16, wherein the first and second support substrates are spaced apart from each of the first and second external electrodes, when viewed from a direction in which the first and second surfaces of the body oppose each other.

21. The coil component of claim 16, wherein the first and second support substrates overlap the first and second external electrodes, respectively, when viewed from a direction in which the first and second surfaces of the body oppose each other.

22. The coil component of claim 16, wherein the first support substrate is spaced apart from all of the plurality of side surfaces of the body except the side surface to which the first support substrate is exposed, and the second support substrate is spaced apart from all of the plurality of side surfaces of the body except the side surface to which the second support substrate is exposed.

* * * * *